(12) United States Patent
Tsuchida et al.

(10) Patent No.: US 12,454,161 B2
(45) Date of Patent: Oct. 28, 2025

(54) METHOD FOR MANUFACTURING VEHICLE SUSPENSION ARM AND VEHICLE SUSPENSION ARM

(71) Applicant: YOROZU CORPORATION, Yokohama (JP)

(72) Inventors: Tomo Tsuchida, Yokohama (JP); Masahiro Igarashi, Yokohama (JP); Masahiro Hosoi, Yokohama (JP)

(73) Assignee: YOROZU CORPORATION, Kanagawa (JP)

( * ) Notice: Subject to any disclaimer, the term of this patent is extended or adjusted under 35 U.S.C. 154(b) by 14 days.

(21) Appl. No.: 18/546,369

(22) PCT Filed: Mar. 5, 2021

(86) PCT No.: PCT/JP2021/008676
§ 371 (c)(1),
(2) Date: Feb. 2, 2024

(87) PCT Pub. No.: WO2022/185525
PCT Pub. Date: Sep. 9, 2022

(65) Prior Publication Data
US 2024/0217289 A1   Jul. 4, 2024

(51) Int. Cl.
*B60G 7/00* (2006.01)
*B21D 28/28* (2006.01)
*B21D 53/88* (2006.01)

(52) U.S. Cl.
CPC ............. *B60G 7/001* (2013.01); *B21D 28/28* (2013.01); *B21D 53/88* (2013.01);
(Continued)

(58) Field of Classification Search
CPC .............. B60G 7/001; B60G 2206/012; B60G 2206/16; B60G 2206/8103;
(Continued)

(56) References Cited

U.S. PATENT DOCUMENTS

| 2009/0277010 | A1 | 11/2009 | Runte et al. | |
| 2017/0144499 | A1* | 5/2017 | Kimura | B21D 5/01 |
| 2022/0203420 | A1* | 6/2022 | Sato | B21D 5/01 |

FOREIGN PATENT DOCUMENTS

| DE | 102007060963 B3 | 4/2009 |
| DE | 102008015393 A1 | 9/2009 |

(Continued)

OTHER PUBLICATIONS

Lee et al. KR 101416548 Machine English Translation, ip.com (Year: 2014).*

(Continued)

*Primary Examiner* — Karen Beck
(74) *Attorney, Agent, or Firm* — LUCAS & MERCANTI, LLP

(57) ABSTRACT

Stepwise bending in the method for manufacturing a vehicle suspension arm includes a first bending step and a second bending step. In the first bending step, preliminary bending is performed while holding a portion that composes a base portion of a body portion and a portion that composes first coupling portions in a workpiece W by a punch (first punch). In the second bending step, while holding of the portion that composes the first coupling portions by the first punch is released subsequently to the first bending step, bending is performed along a fold given by the first bending step while holding the portion that composes the base portion of the body portion by a punch (second punch).

6 Claims, 7 Drawing Sheets

(52) U.S. Cl.
CPC .... *B60G 2206/012* (2013.01); *B60G 2206/16* (2013.01); *B60G 2206/8103* (2013.01); *B60G 2206/83* (2013.01)

(58) Field of Classification Search
CPC ........ B60G 2206/83; B60G 2206/0122; B60G 2206/161; B60G 7/00; B21D 28/28; B21D 5/015; B21D 19/088; B21D 22/26; B21D 28/26
See application file for complete search history.

(56) References Cited

FOREIGN PATENT DOCUMENTS

| | | | | |
|---|---|---|---|---|
| JP | 2015-039716 | A | 3/2015 | |
| JP | 6356223 | B2 | 7/2018 | |
| KR | 101416548 | * | 7/2014 | ............ B21D 19/12 |
| KR | 101416548 | B1 | 7/2014 | |
| WO | 2020/116320 | A1 | 6/2020 | |
| WO | 2020/213354 | A1 | 10/2020 | |

OTHER PUBLICATIONS

European Patent Office, "Extended European Search Report" issued for 21929097.0 on Mar. 26, 2024, 9 pages.

Office Action, mailed Oct. 1, 2024, for the corresponding Japanese Patent Application No. 2023-503318, 8 pages, with English Translation.

International Search Report dated Apr. 6, 2021 for the corresponding patent application No. PCT/JP2021/008676, with English translation.

* cited by examiner (A)

(B)

(C)

METHOD FOR MANUFACTURING VEHICLE SUSPENSION ARM AND VEHICLE SUSPENSION ARM

CROSS REFERENCE TO RELATED APPLICATION

This Application is a 371 of PCT/JP2021/008676 filed on Mar. 5, 2021, which is incorporated herein by reference.

TECHNICAL FIELD

The present invention relates to a method for manufacturing a vehicle suspension arm and a vehicle suspension arm.

BACKGROUND ART

A vehicle suspension arm is used to couple a vehicle body and a wheel. The vehicle suspension arm has through-holes facing each other in coupling portions disposed at an end portion in a longitudinal direction (see Patent Literatures 1 and 2). The through-hole is formed by burring and has a cylindrical flange.

Patent Literature 1 discloses the method for forming through-holes by burring by a cam mechanism (die) finally after forming an arm body portion when manufacturing a vehicle suspension arm.

Patent Literature 2 discloses a method for forming an arm by a progressive method (progressive method). In this method, a through-hole is previously formed by burring in a base material having a flat plate shape, and thereafter, the workpiece is bent.

CITATION LIST

Patent Literature

Patent Literature 1: Japanese Patent Laid-Open No. 2015-39716
Patent Literature 2: International Publication No. WO2020/116320

SUMMARY OF INVENTION

Technical Problem

However, in the case of the method using a cam mechanism as in Patent Literature 1, there is the problem that the die structure is complicated. Further, as the product width between the coupling portions forming the through-holes decreases, constraints arise in the die support structure during burring forming. Therefore, there arises the problem that deformation of the molding die occurs, or maintenance increases. In addition, depending on the product shape, constraints arise in the space of the support die during burring forming, and the die structure is not established after all.

In the case of the progressive method (progressive method) as in Patent Literature 2, when the product width between the coupling portions is narrow, the shape of the feed crossbar portion connecting the base material and the arm component becomes thin. Due to this, the cutting edge of the punch that cuts the arm component from the base material becomes thin. Problems arise in durability of the punch, and the method is not suitable for stable manufacturing. As a result, the method is not suitable for mass production of the arm components.

Accordingly, it is an object of the present invention to provide a technology capable of satisfying quality (coaxiality and circularity) of a pair of through-holes in a vehicle suspension arm that is manufactured by forming at least the pair of through-holes including a cylindrical flange by burring in a workpiece, and applying stepwise bending to the workpiece.

Solution to Problem

One aspect of the present invention is a method for manufacturing a vehicle suspension arm including a hollow body portion, and coupling portions facing each other in a state where axes of a pair of through-holes are aligned with each other, by forming at least the pair of through-holes including cylindrical flanges raised from a plate surface, in a workpiece by burring, and applying stepwise bending to the workpiece. The body portion includes two side walls facing each other, and a base portion connecting the two side walls to each other and extends along one direction, and the coupling portions extend along the one direction from end portions in the one direction, of the two side walls and face each other apart from each other. The stepwise bending includes a first bending step, and a second bending step. In the first bending step, preliminary bending is performed while holding a portion that composes the base portion of the body portion and a portion that composes the coupling portions in the workpiece by a first punch. In the second bending step, while holding of the portion that composes the coupling portions by the first punch is released subsequently to the first bending step, bending is performed along a fold given by the first bending step while holding the portion that composes the base portion of the body portion by a second punch.

Another aspect of the present invention is a vehicle suspension arm manufactured by the method for manufacturing a vehicle suspension arm described above.

Advantageous Effect of Invention

According to the present invention, it is possible to satisfy quality (coaxiality and circularity) of the pair of through-holes in the vehicle suspension arm manufactured by forming at least the pair of through-holes including the cylindrical flanges in the workpiece by burring and applying stepwise bending to the workpiece. Even with the product shape in which the product width of the coupling portions is narrow and it is difficult to form the through-holes by burring by the cam mechanism (die), it is possible to mass-produce the vehicle suspension arms that satisfy the quality (coaxiality and circularity) of the pair of through-holes.

DESCRIPTION OF EMBODIMENTS

Hereinafter, a mode for carrying out the present invention will be described in detail with reference to the drawings. The embodiment shown here is illustrated to embody a technical idea of the present invention and is not intended to limit the present invention. Accordingly, other modes, examples, and operational techniques and the like that can be considered by those skilled in the art or the like within the scope without departing from the gist of the present invention are all included within the scope and gist of the present invention and are included within the scope of the claims and their equivalents.

Further, the drawings attached to the present description may be modified from a real thing and schematically expressed in terms of scale, length-to-width ratio, shape and the like as appropriate for convenience of illustration and understanding, but are merely examples, and are not intended to limit the interpretation of the present invention.

Note that in the present description, ordinal numerals such as "first" and "second" may be assigned. However, unless otherwise indicated with respect to these ordinal numerals, these ordinal numerals are assigned to discriminate components for convenience of explanation and are not intended to identify the number or order.

The embodiment of the present invention will be described with reference to the drawings. Note that in the present embodiment, a placement surface in which a workpiece is placed is defined as an XY plane, a direction in which a flat plate extends is defined as an X direction (first direction), a direction orthogonal to the X direction in the placement surface is defined as a Y direction (second direction), and a direction orthogonal to the XY plane is defined as a Z direction (third direction).

Figure 1:
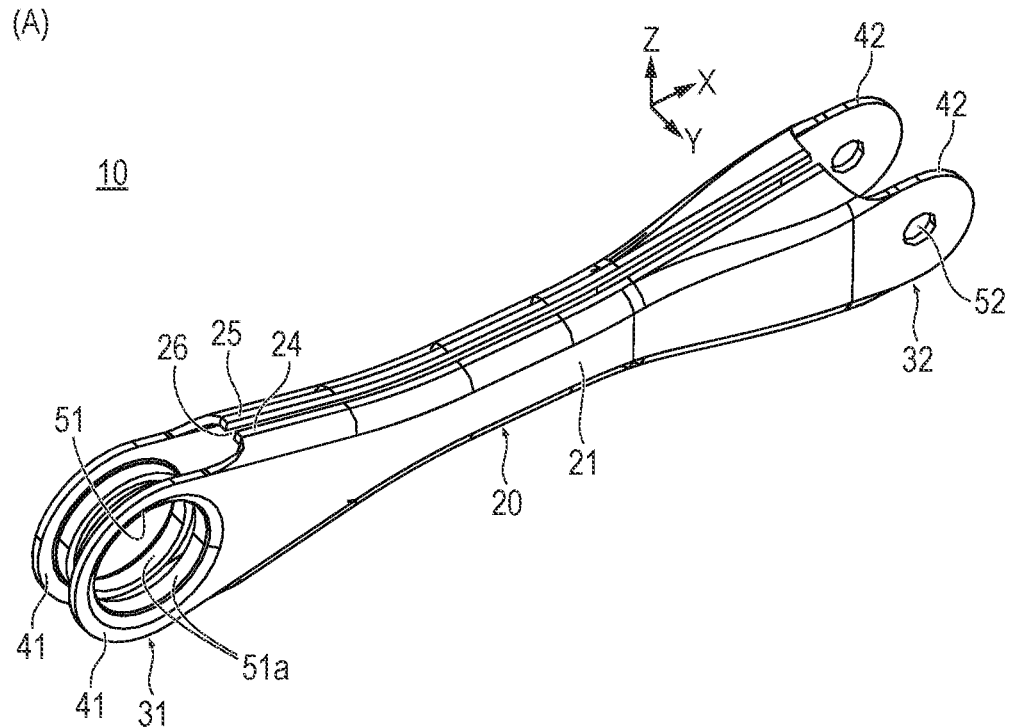
FIG. 1 shows a perspective view (A), a front view (B), and a top view (C) each showing a vehicle suspension arm of an embodiment.
Figure 1:
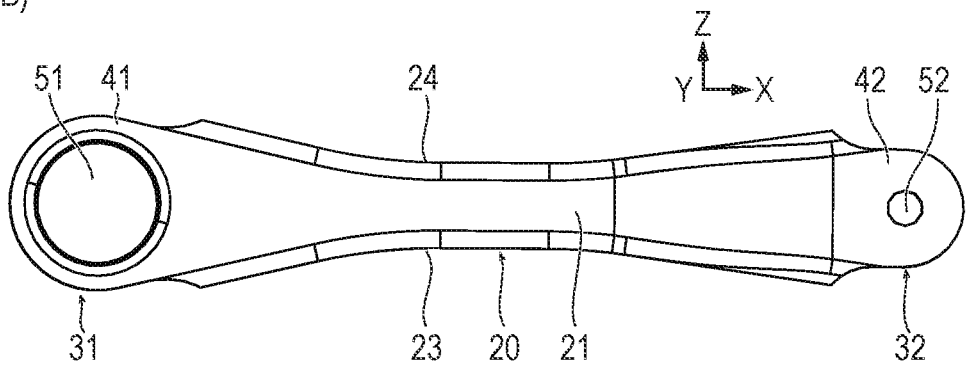
Figure 1:
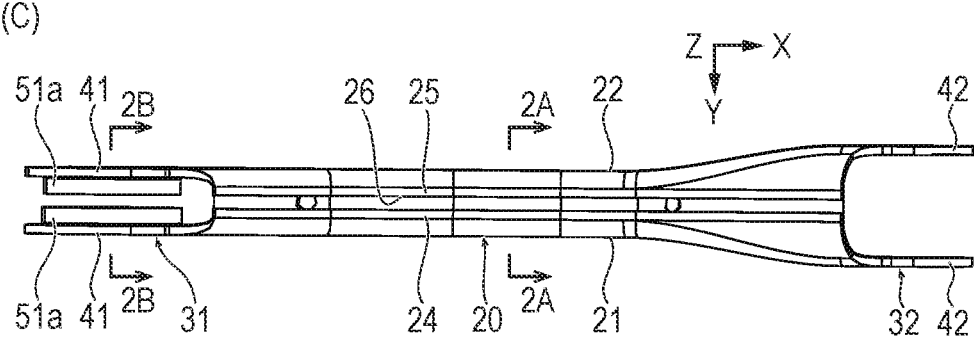
Figure 2:
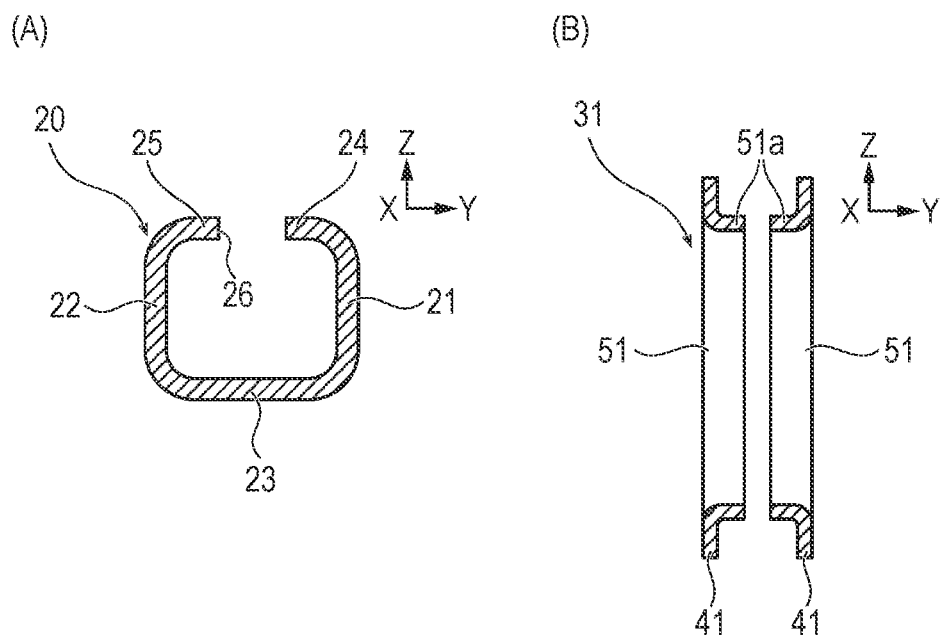
FIG. 2 shows a sectional view (A) along line 2A-2A in FIG. 1(C), and a sectional view (B) along line 2B-2B in FIG. 1(C).

FIG. 1(A), FIG. 1(B), and FIG. 1(C) are a perspective view, a front view, and a top view showing a vehicle suspension arm 10 of the embodiment. FIG. 2(A) and FIG. 2(B) are a sectional view along line 2A-2A in FIG. 1(B) and a sectional view along line 2B-2B in FIG. 1(B).

The vehicle suspension arm 10 of the embodiment is used, for example, in a multi-link type suspension. In the following explanation, the vehicle suspension arm 10 is also simply referred to as a "suspension arm 10".

Roughly describing, as shown in FIG. 1(A), FIG. 1(B), FIG. 1(C), FIG. 2(A), and FIG. 2(B), the suspension arm 10 is formed by forming at least a pair of through-holes 51 each including a cylindrical flange 51a, in a workpiece by burring, and applying stepwise bending to the workpiece. The suspension arm 10 has a hollow body portion 20, and coupling portions 31 that face each other in a state in which axes of the pair of through-holes 51 are aligned with each other. The body portion 20 has two side walls 21 and 22 that face each other, and a base portion 23 that connects the two side walls 21 and 22 to each other, and extends along one direction. The coupling portions 31 extend along the one direction from end portions in the one direction of the two side walls 21 and 22, and face each other apart from each other. In the embodiment, the one direction corresponds to the X direction (first direction). Hereinafter, details will be described.

As shown in FIG. 1(A), FIG. 1(B), and FIG. 1(C), the suspension arm 10 has the body portion 20, the first coupling portions 31 (corresponding to coupling portions) provided at a left end portion in the drawings along the X direction of the body portion 20, and second coupling portions 32 provided at a right end portion in the drawings along the X direction of the body portion 20.

As shown in FIG. 2(A), the body portion 20 has the two side walls 21 and 22 that face each other, and the base portion 23 that connects the two side walls 21 and 22 to each other. The body portion 20 further has inward rib portions 24 and 25 in which end surfaces in the two side walls 21 and 22 face each other, in a section orthogonal to the X direction. End surfaces of the inward rib portions 24 and 25 face each other via a gap 26. In this way, the body portion 20 has a hollow shape with an open section having the gap 26.

The first coupling portions 31 are configured by two first plate portions 41 facing each other along the Y direction. The two first plate portions 41 extend along the X direction from left end portions in FIG. 1(B) and FIG. 1(C) along the X direction of the two side walls 21 and 22. The two first plate portions 41 are not connected by a member such as the base portion 23 in the body portion 20, and face each other apart from each other. As shown in FIG. 2(B), in the two first plate portions 41, the first through-holes 51 (corresponding to through-holes) are formed in positions that face each other along the Y direction. The first through-holes 51 are formed by burring, and include the cylindrical flanges 51a. A bush is press-fitted to an inside of the first through-hole 51, and is coupled to a shaft member (not illustrated) protruded from a vehicle body side via an elastic member such as rubber.

The second coupling portions 32 are configured by two plate portions 42 facing each other along the Y direction similarly to the first coupling portions 31. The two second plate portions 42 extend along the X direction from right end portions in FIG. 1(B) and FIG. 1(C) along the X direction of the two side walls 21 and 22. The two second plate portions 42 are not connected by a member such as the base portion 23 in the body portion 20, and face each other apart from each other. In the two second plate portions 42, second through-holes 52 are formed in positions facing each other along the Y direction. The second through-holes 52 are formed by piercing using a cam mechanism (die). A hole diameter of the second through-hole 52 is formed to be smaller than a hole diameter of the first through-hole 51. A bolt (not illustrated) from a wheel side is inserted through an inside of the second through-hole 52 and is coupled to a wheel (not illustrated) by a nut (not illustrated).

Figure 3:
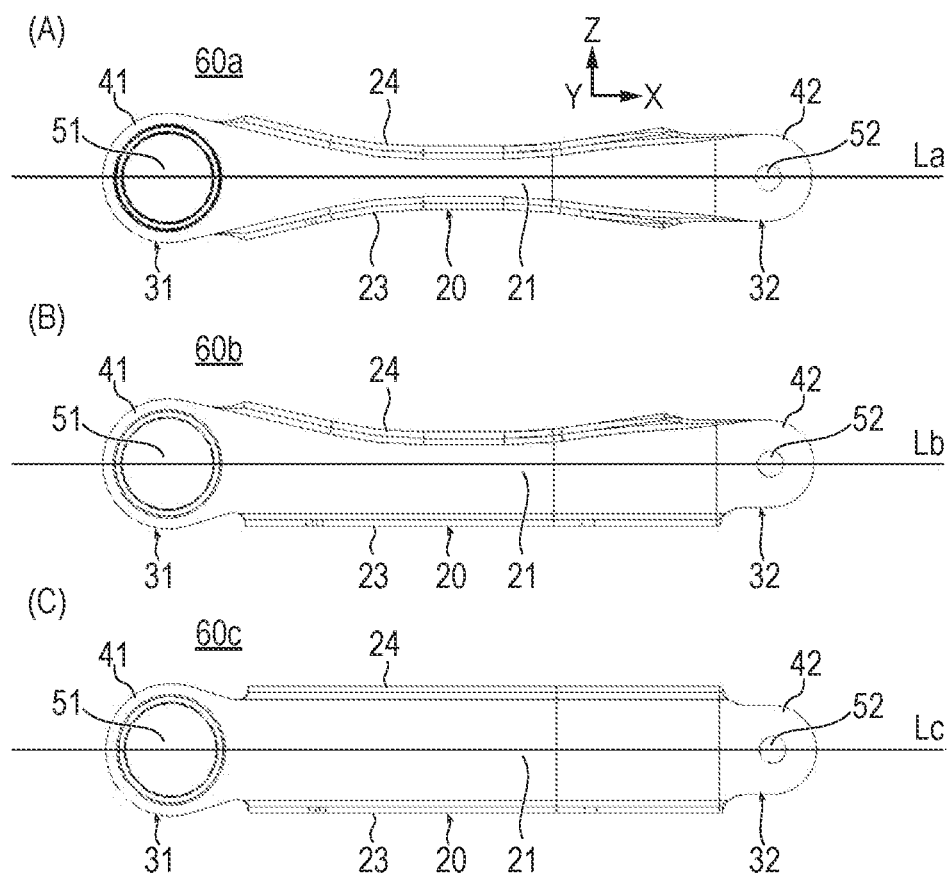
FIG. 3 shows explanatory views (A) through (C) used in explanation about a point in which weight reduction of the arm is achieved by a bent shape of the vehicle suspension arm.

FIG. 3(A), FIG. 3(B), and FIG. 3(C) are explanatory views for use in explanation of a point in which weight reduction of the arm is achieved by a bent shape of the vehicle suspension arm.

As shown in FIG. 3(C), in a state where a suspension arm 60c is viewed from a front, an upper portion and a lower portion of the body portion 20 do not bend, and is in a linear shape along the X direction. Dimensions between an upper portion and a lower portion of the body portion 20, and line segments (for example, Lc described later) along the X direction on surfaces of the side walls 21 and 22 are constant along the X direction. In the case of this mode, the axis Lc connecting a center of the first through-hole 51 and a center of the second through-hole 52 is positioned in a center in the Z direction of the body portion 20.

As shown in FIG. 3(B), in a state where a suspension arm 60b is viewed from a front, a base portion 23 of a body portion 20 does not bend, and is in a linear shape along the X direction. On the other hand, end portions (top surfaces of inward rib portions 24 and 25) on an opposite side to the base portion 23 in side walls 21 and 22 have bent shapes (recessed shapes) in which dimensions between the end portions and line segments (for example, Lb described later) along the X direction on surfaces of the side walls 21 and 22 gradually increase toward end portions in the X direction. In the case of this mode, the axis Lb connecting a center of a first through-hole 51 and a center of a second through-hole 52 is positioned near an upper portion in the Z direction of the body portion 20. The suspension arm 60b shown in FIG. 3(B) has a lighter weight than the suspension arm 60c shown in FIG. 3(C) by a bent shape thereof.

As shown in FIG. 3(A), in a state where a suspension arm 60a is viewed from a front, a base portion 23 of a body portion 20 has a bent shape (protruded shape) in which dimensions between the base portion 23 and line segments (for example, La described later) along the X direction on surfaces of side walls 21 and 22 gradually increase toward end portions in the X direction. End portions (top surfaces of inward rib portions 24 and 25) on an opposite side to the base portion 23 in the side walls 21 and 22 have bent shapes (recessed shapes) in which dimensions between the end portions and line segments (for example, La described later) along the X direction on surfaces of the side walls 21 and 22 gradually increase toward end portions in the X direction. In the case of this mode, the axis La connecting a center of a first through-hole 51 and a center of a second through-hole 52 is positioned in a center in the Z direction of the body portion 20. The suspension arm 60a shown in FIG. 3(A) has a lighter weight than the suspension arm 60b shown in FIG. 3(B) due to the bent shape thereof.

Subsequently, a method for manufacturing the suspension arm 10 will be described. Note that of both surfaces in a thickness direction of a workpiece W, a surface to be on an outer side of the suspension arm 10 is referred to as a front surface, and a surface to be on an inner side of the suspension arm 10 is referred to as a back surface. A term "plate surface" used in the present description means the front surface or the back surface in the thickness direction of the workpiece W.

Figure 4:
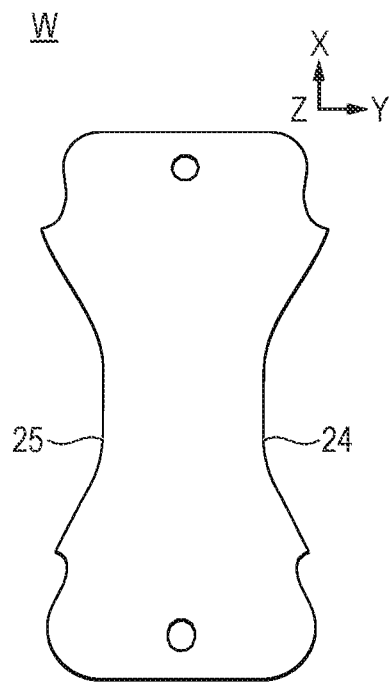
FIG. 4 is a view showing a workpiece of a blank step.

FIG. 4 is a view showing the workpiece W in a blank step. A surface on a front side in the drawing of the workpiece W is the back surface.

A material of the workpiece W is not particularly limited, but use of a high tensile steel plate having strength and a light weight is preferable. In the blank step, processing bases (for example, a reference surface, a reference hole, a locating hole, and the like) are determined. Further, an outer circumferential line is taken out, and trim lines of the inward rib portions 24 and 25 are determined. Note that an overall trim line may be determined depending on a product shape.

Figure 5:
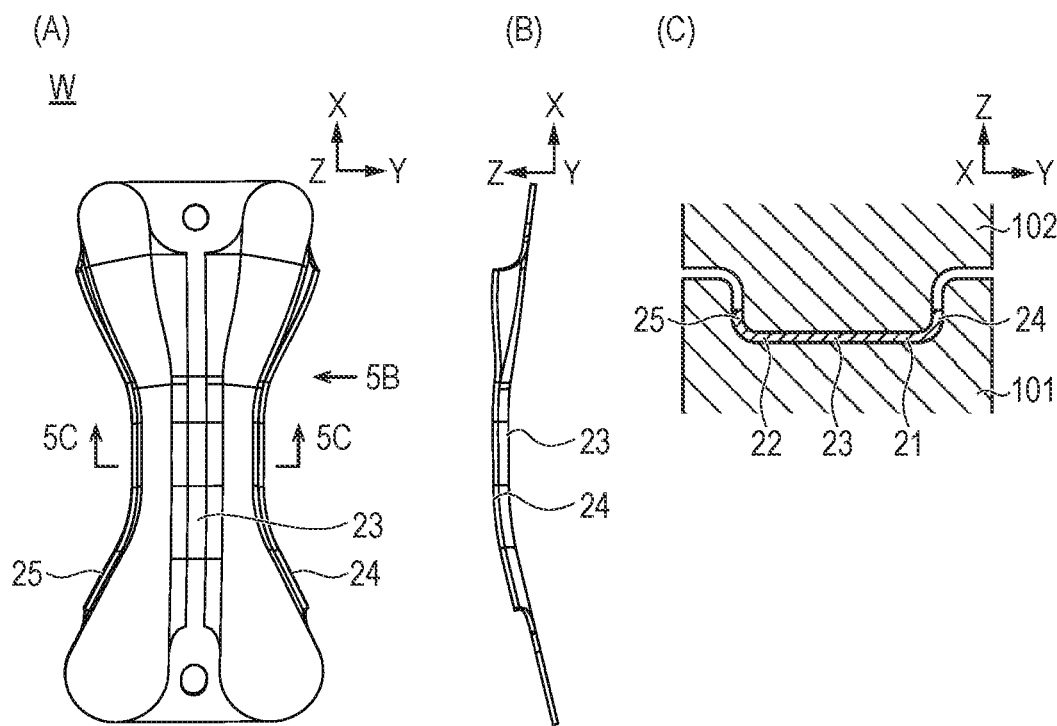
FIG. 5 shows a view (A) showing the workpiece in a flange bending step, an arrow view (B) along line 5B in FIG. 5(A), and a sectional view (C) showing the flange bending step in a section along line 5C-5C in FIG. 5(A).

FIG. 5(A) is a view showing the workpiece W in a flange bending step, FIG. 5(B) is an arrow view along line 5B in FIG. 5(A), and FIG. 5(C) is a sectional view showing the flange bending step in a section along line 5C-5C in FIG. 5(A).

In the flange bending step (corresponding to a step of bending to curvature, and a rib bending step), preliminary bending of a curvature surface (portion that composes the base portion 23 of the body portion 20) and the inward rib portions 24 and 25 is performed. In order to enhance positional accuracy of the first through-holes 51 formed by burring, the curvature surface is bent to a curvature corresponding to a bent shape of the base portion 23 before a pilot hole for burring is processed (see FIG. 5(B)). Further, ribs for keeping a necessary punch width in a third bending step described later are formed. The ribs compose the inward rib portions 24 and 25. As shown in FIG. 5(C), the workpiece W is pressed by a die 101 and a punch 102, and portions composing the inward rib portions 24 and 25 are bent. At this time, the workpiece W is pressed by the punch 102 from a back surface side, with a front surface side placed on the die 101. The inward rib portions 24 and 25 are bent toward the back surface side of the workpiece W.

Figure 6:
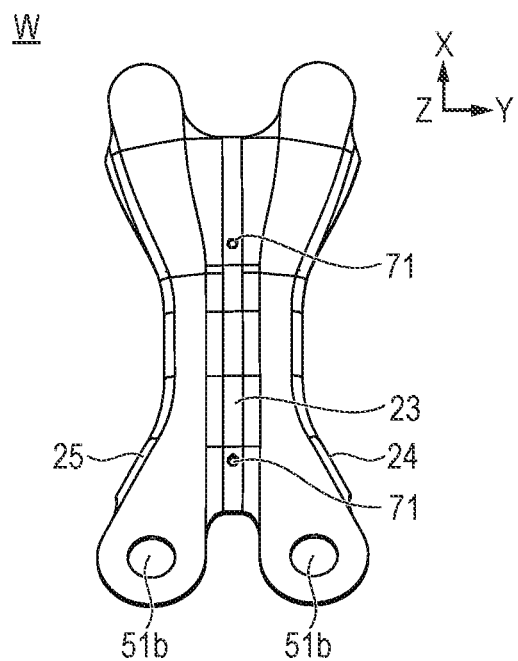
FIG. 6 is a view showing the workpiece in a trimming step.

FIG. 6 is a view showing the workpiece W in a trimming step.

In the trimming step, trimming for a product contour, and processing of the pilot hole 51b for burring are performed. In order to prevent shape change of the contour during burring, trimming, and processing of the pilot hole 51b are simultaneously performed. Reference sign 71 in FIG. 6 denotes a locating hole used to position the workpiece W.

Figure 7:
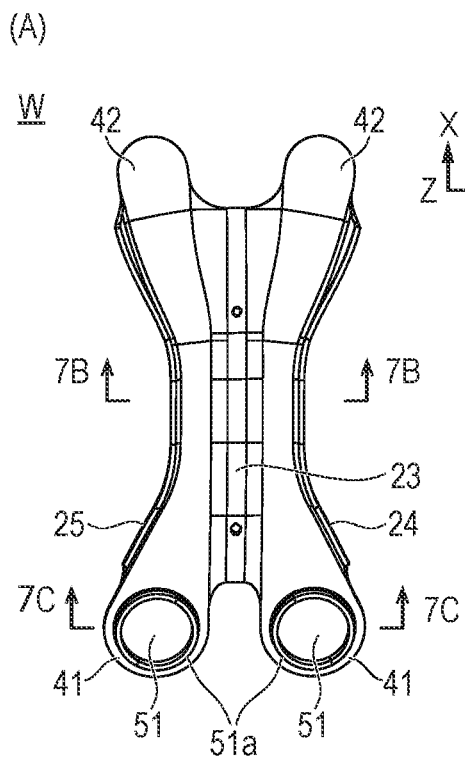
FIG. 7 shows a view (A) showing the workpiece in a burring step, a sectional view (B) showing the burring step in a section along line 7B-7B in FIG. 7(A), and a sectional view (C) showing the burring step in a section along line 7C-7C in FIG. 7(A).
Figure 7:
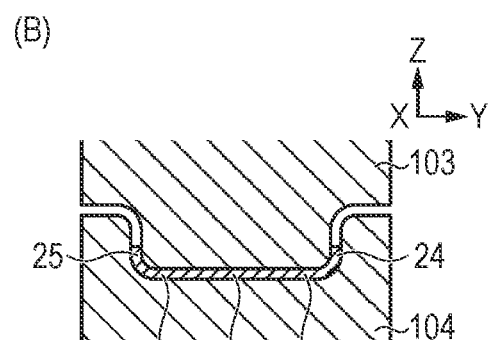
Figure 7:
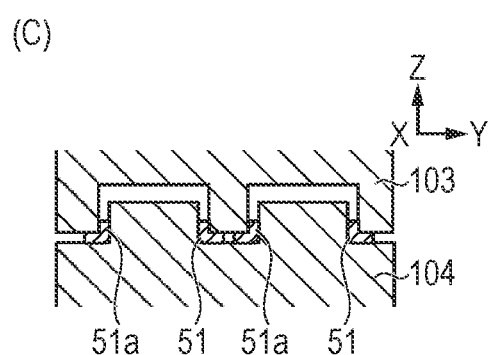

FIG. 7(A) is a view showing the workpiece W in the burring step, FIG. 7(B) is a sectional view showing the burring step in a section along line 7B-7B in FIG. 7(A), and FIG. 7(C) is a sectional view showing the burring step in a section along line 7C-7C in FIG. 7(A).

In the burring step, the pair of first through-holes 51 including the cylindrical flanges 51a that are raised from the plate surface by burring are formed in the workpiece W. In order to enhance positional accuracy of the first through-holes 51, all the first through-holes 51 (two in the embodiment) are simultaneously formed by burring. As shown in FIG. 7(B) and FIG. 7(C), the workpiece W is pressed by a die 103 and a punch 104, and the pair of first through-holes 51 are formed while the portion that composes the body portion 20 is sandwiched. At this time, the portion that composes the body portion 20 of the workpiece W is sandwiched with the die 103 contacting the back surface, and the punch 104 contacting the front surface (see FIG. 7(B)). Protruded portions of the punch 104 are pushed into pilot holes 51b from the front surface side, and the first through-holes 51 are formed (see FIG. 7(C)). The cylindrical flanges 51a rise from the back surface that is the plate surface of the workpiece W by burring.

Figure 8:
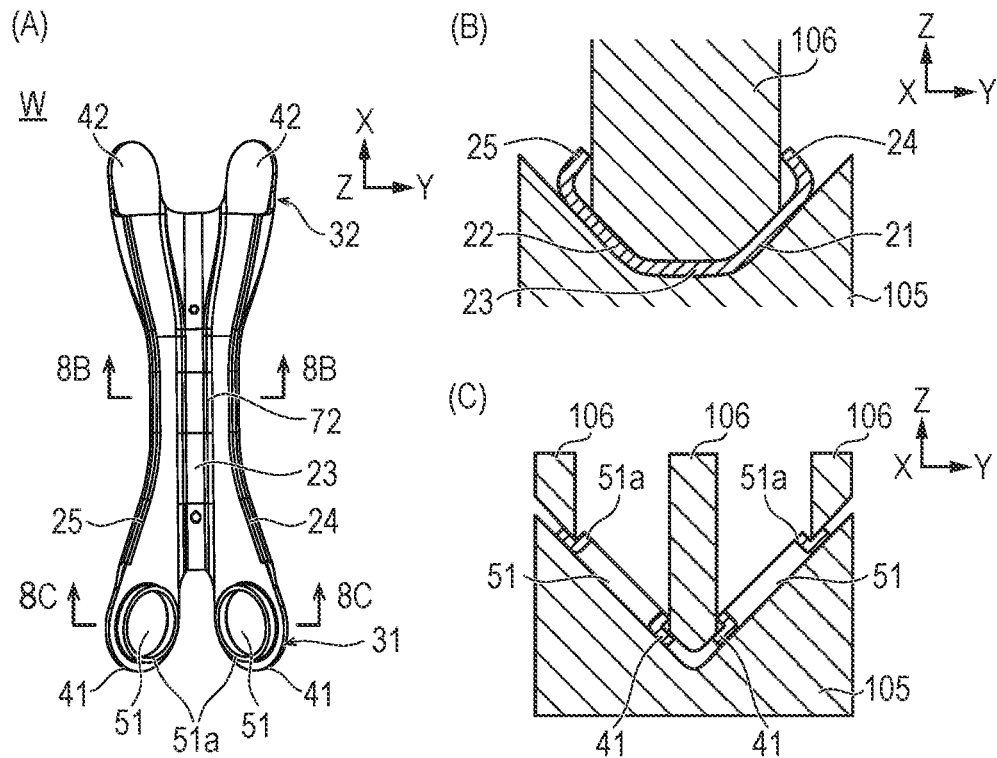
FIG. 8 shows a view (A) showing the workpiece in a first bending step, a sectional view (B) showing the first bending step in a section along line 8B-8B in FIG. 8(A), and a sectional view (C) showing the first bending step in a section along line 80-8C in FIG. 8(A).

FIG. 8(A) is a view showing the workpiece W in a first bending step, FIG. 8(B) is a sectional view showing the first bending step in a section along line 8B-8B in FIG. 8(A), and FIG. 8(C) is a sectional view showing the first bending step in a section along line 80-8C in FIG. 8(A).

In the first bending step, preliminary bending is performed while holding the portion that composes the base portion 23 of the body portion 20 and a portion that composes the first coupling portions 31 in the workpiece W by a punch 106 (corresponding to a first punch). A bending angle is not particularly limited, and is, for example, 20 degrees to 50 degrees. As shown in FIG. 8(B) and FIG. 8(C), the workpiece W is pressed by a die 105 and the punch 106. The workpiece W is pushed down along the die 105, while the portion that composes the base portion 23 of the body portion 20 and the portion that composes the first coupling portions 31 are held by the punch 106. In the portion that composes the base portion 23 of the body portion 20 and the portion that composes the first coupling portions 31 in the workpiece W, the punch 106 contacts the back surface, and the die 105 contacts the front surface. According to the first bending step like this, it is possible to attach a fold 72 (see FIG. 8(A)) while maintaining coaxiality and circularity of the first through-holes 51.

Preliminary bending in the first bending step is performed while also holding portions that compose the two side walls 21 and 22 of the body portion 20 by the punch 106 (see FIG. 8(B)). In the portions that compose the two side walls 21 and 22, the punch 106 contacts the back surface, and the die 105 contacts the front surface. By doing so, the fold 72 can be attached accurately.

The portion that composes the first coupling portions 31 includes the plate surface around the raised flanges 51a. Preliminary bending in the first bending step is performed while holding the plate surface around the flanges 51a by the punch 106 (see FIG. 8(C)). In the plate surface around the flanges 51a, the punch 106 contacts the back surface, and the die 105 contacts the front surface. By doing so, it is possible to attach the fold 72 while more accurately maintaining coaxiality and circularity of the first through-holes 51.

Figure 9:
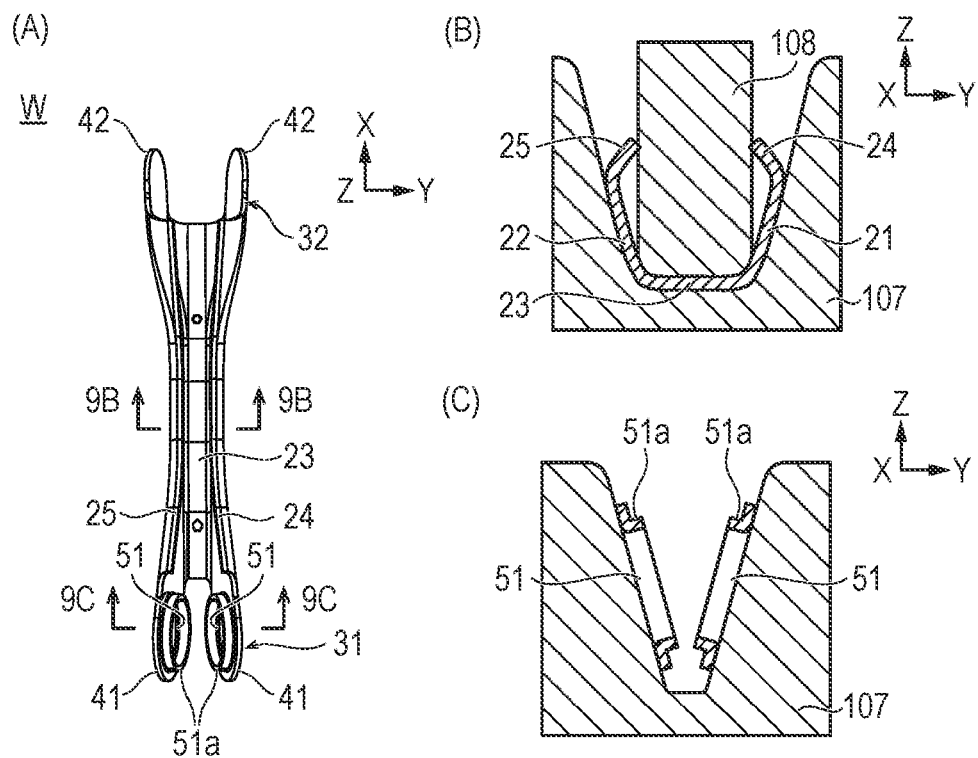
FIG. 9 shows a view (A) showing the workpiece in a second bending step, a sectional view (B) showing the second bending step in a section along line 9B-9B in FIG. 9(A), and a sectional view (C) showing the second bending step in a section along line 9C-9C in FIG. 9(A).

FIG. 9(A) is a view showing the workpiece W in a second bending step, FIG. 9(B) is a sectional view showing the second bending step in a section along line 9B-9B in FIG. 9(A), and FIG. 9(C) is a sectional view showing the second bending step in a section along line 9C-9C in FIG. 9(A).

Subsequently to the first bending step, the second bending step is carried out. In the second bending step, while holding of the portion that composes the first coupling portions 31 by the punch 106 (first punch) is released, bending is performed along the fold given by the first bending step while holding the portion that composes the base portion 23 of the body portion 20 by a punch 108 (corresponding to a second punch). A bending angle is not particularly limited, and is, for example, 50 degrees to less than 90 degrees. As shown in FIG. 9(B) and FIG. 9(C), the workpiece W is pressed by a die 107 and the punch 108. The workpiece W is pushed down along the die 107 while the portion that composes the base portion 23 of the body portion 20 is held by the punch 108 without holding the portion that composes the first coupling portions 31. In the portion that composes the base portion 23 of the body portion 20 of the workpiece W, the punch 108 contacts the back surface, and the die 107 contacts the front surface. A tip end of the punch 108 has R (radius) shapes of a product made of a curvature surface (base portion 23 of the body portion 20) and the side walls 21 and 22. According to the second bending step, it is possible to bend a portion that composes the two first plate portions 41 composing the first coupling portions 31 while maintaining coaxiality and circularity of the first through-holes 51.

In the present description, concerning the second bending step, "bends along the fold 72 that is given by the first bending step" is not intended to be limited to only the case of bending from the fold 72. It should be understood that the case of bending from a bending line that is set parallel or substantially parallel to the fold 72 by slightly shifting from the fold 72 is also included in "bends along the fold 72 that is given by the first bending step".

Figure 10:
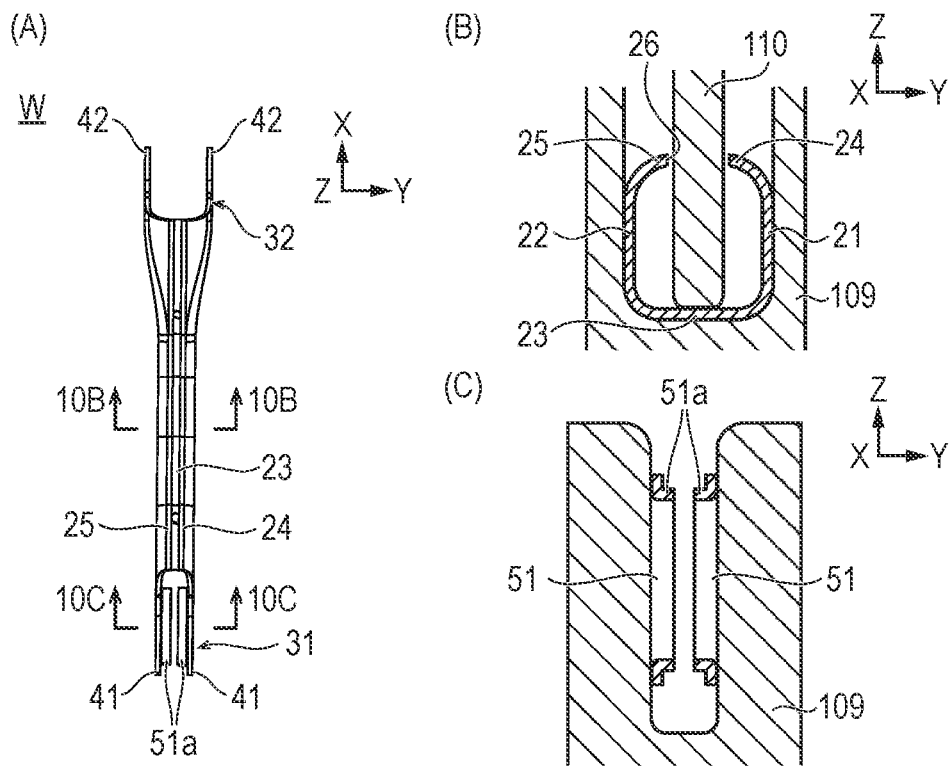
FIG. 10 shows a view (A) showing the workpiece in a third bending step, a sectional view (B) showing the third bending step in a section along line 10B-10B in FIG. 10(A), and a sectional view (C) showing the third bending step in a section along line 10C-10C in FIG. 10(A).

FIG. 10(A) is a view showing the workpiece W in the third bending step, FIG. 10(B) is a sectional view showing the third bending step in a section along line 10B-10B in FIG. 10(A), and FIG. 10(C) is a sectional view showing the third bending step in a section along line 10C-10C in FIG. 10(A).

Subsequently to the second bending step, the third bending step is carried out. In the third bending step, while holding of the portion that composes the first coupling portions 31 by the punch 106 (first punch) is released, bending is performed until the portions that compose the two side walls 21 and 22 face each other, and axes of the pair of through-holes 51 of the first coupling portions 31 face each other in a state where the axes of the pair of first through-holes 51 are aligned with each other, while holding the portion that composes the base portion 23 of the body portion 20 by a punch 110 (corresponding to a third punch). A bending angle is 90 degrees. As shown in FIG. 10(B) and FIG. 10(C), the workpiece W is pressed by a die 109 and the punch 110. The punch 110 is passed through the gap 26 between the inward rib portions 24 and 25, and the punch 110 pushes down the workpiece W along the die 109 while the punch 110 holds the portion that composes the base portion 23 of the body portion 20. In the portion that composes the base portion 23 of the body portion 20 of the workpiece W, the punch 110 contacts the back surface, and the die 109 contacts the front surface. By pushing the workpiece W into the die 109, the two side walls 21 and 22 of the body portion 20 are bent at 90 degrees with respect to the base portion 23, and the two first plate portions 41 of the first coupling portions 31 are caused to face each other parallel to each other.

Figure 11:
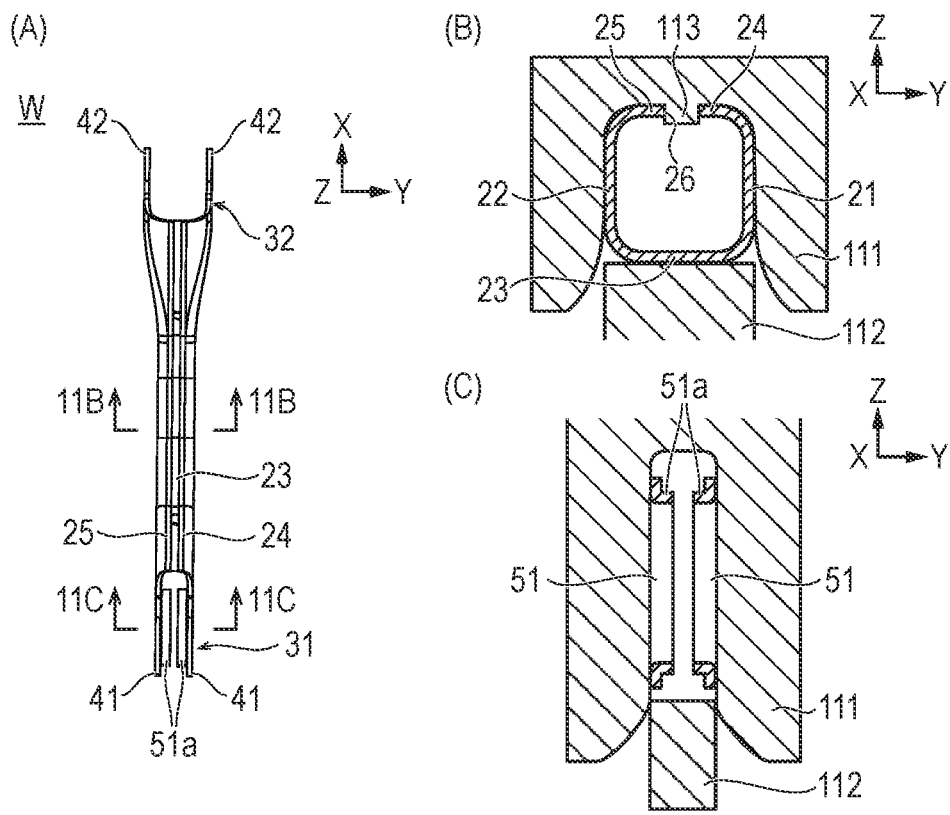
FIG. 11 shows a view (A) showing the workpiece in a restrike step, a sectional view (B) showing the restrike step in a section along line 11B-11B in FIG. 11(A), and a sectional view (C) showing the restrike step in a section along line 11C-11C in FIG. 11(A).

FIG. 11(A) is a view showing the workpiece W in a restrike step, FIG. 11(B) is a sectional view showing the restrike step in a section along line 11B-11B in FIG. 11(A), and FIG. 11(C) is a sectional view showing the restrike step in a section along line 11C-11C in FIG. 11(A).

In the restrike step, correction of the product width, and forming of the inward rib portions 24 and 25 are performed. As shown in FIG. 11(B) and FIG. 11(C), the workpiece W is pressed by a die 111 and a die 112. While a protrusion portion 113 of the die 111 is inserted in the gap 26 between the inward rib portions 24 and 25 to support the inward rib portions 24 and 25 so that they do not bend excessively, the workpiece W is pressure-formed from an outer periphery to an inner periphery. By pressing the two side walls 21 and 22, the product width is corrected, and the two first plate portions 41 of the first coupling portions 31 are corrected to be parallel. By the restrike step, a hollow shape with an open section in which end surfaces in the two side walls 21 and 22 face each other via the gap 26 is formed. The protrusion portion 113 of the die 111 is provided at a distance equal to or greater than the gap 26 in the X direction extending in the X direction, and thereby the hollow shape with the open section is formed from one end to the other end along the X direction.

Figure 12:
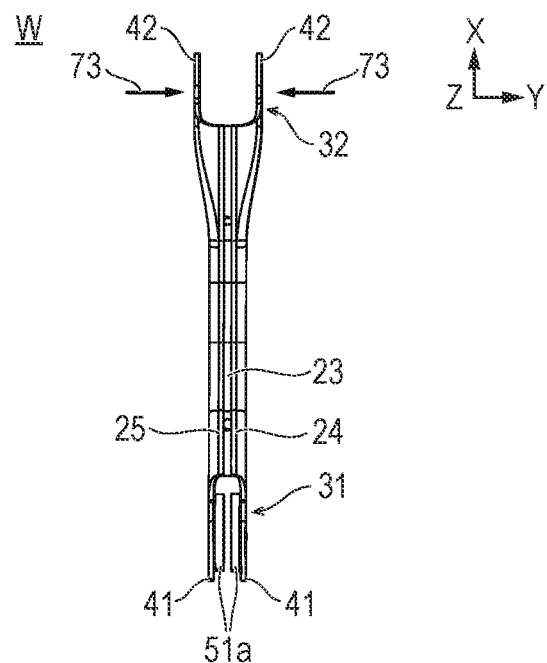
FIG. 12 is a view showing the workpiece in a cam pierce step.

FIG. 12 is a view showing the workpiece W in a cam pierce step.

In the cam pierce step, the second through-holes 52 are formed at positions facing each other along the Y direction in the two second plate portions 42 of the second coupling portions 32. The workpiece W is positioned by a locating pin. The second through-holes 52 are formed by piercing by a cam mechanism (die) (see arrows 73 in FIG. 12).

By the above respective steps, the suspension arm 10 is manufactured.

As described above, the stepwise bending in the method for manufacturing the vehicle suspension arm 10 of the present embodiment has the first bending step of performing preliminary bending while holding the portion that composes the base portion 23 of the body portion 20 and the portion that composes the first coupling portions 31 in the workpiece W by the punch 106 (first punch), and the second bending step of, while releasing holding of the portion that composes the first coupling portions 31 by the punch 106 (first punch) subsequently to the first bending step, performing bending along the fold that is given by the first bending step while holding the portion that composes the base portion 23 of the body portion 20 by the punch 108 (second punch).

Further, the vehicle suspension arm 10 of the present embodiment is manufactured according to the above-described manufacturing method.

By the configuration like this, it is possible to satisfy the quality (coaxiality and circularity) of the pair of first through-holes 51, in the vehicle suspension arm 10 that is manufactured by forming at least the pair of first through-holes 51 including the cylindrical flanges 51a raised from the plate surface in the workpiece W by burring, and applying the stepwise bending to the workpiece W. Even with the product shape in which the product width in the first coupling portions 31 (width between the first plate portions 41) is narrow and it is difficult to form the first through-holes 51 by burring by the cam mechanism (die), it is possible to mass-produce the vehicle suspension arms 10 that satisfy the quality (coaxiality and circularity) of the pair of first through-holes 51.

In the present embodiment, the support die of the pair of first through-holes 51 that are formed by burring is not required. Therefore, it is possible to avoid deformations and insufficient strength due to shrinkage of the die (in particular, shrinkage in the thickness direction and shrinkage of the support die) following the product width and burring shape which become problems in the method using the cam structure. Accordingly, die cost can be reduced by the structure of the die itself, reduction in die failure, and increase in die life. Further, it is possible to obtain reduction in the number of setup steps, and stable burring quality. In addition, since reduction in product width and constraints of the peripheral shape of the first through-holes 51 are also eliminated, a degree of freedom of layout increases to be able to contribute to increase in strength and reduction in weight.

The preliminary bending in the first bending step is performed while also holding the portions that compose the two side walls 21 and 22 of the body portion 20 by the punch 106 (first punch). By the configuration like this, the fold 72 can be attached accurately.

The portion that composes the first coupling portions 31 includes the plate surface around the raised flanges 51a. The preliminary bending in the first bending step is performed while holding the plate surface around the flanges 51a by the punch 106 (first punch). By the configuration like this, the fold 72 can be attached while coaxiality and circularity of the first through-holes 51 are more accurately maintained.

The stepwise bending further has the third bending step of, while releasing holding of the portion that composes the first coupling portions 31 by the punch 106 (first punch), subsequently to the second bending step, performing bending until the portions that compose the two side walls 21 and 22 face each other, and the axes of the pair of first through-holes 51 of the first coupling portions 31 face each other in the state where the axes of the pair of first through-holes 51 are aligned with each other, while holding the portion that composes the base portion 23 of the body portion 20 by the punch 110 (third punch). By the configuration like this, the two side walls 21 and 22 of the body portion 20 can be bent at 90 degrees with respect to the base portion 23, and the two first plate portions 41 of the first coupling portions 31 can be caused to face each other parallel to each other.

The base portion 23 of the body portion 20 has the bent shape in which dimensions between the base portion 23 and line segments along the X direction on the surfaces of the side walls 21 and 22 gradually increase toward the end portions in the X direction. The stepwise bending further has the step of bending the portion that composes the base portion 23 of the workpiece W before forming the pair of first through-holes 51 to a curvature corresponding to the bent shape. By the configuration like this, weight reduction of the arm can be achieved with the bent shape of the suspension arm 10.

The end portions on the opposite side to the base portion 23 in the side walls 21 and 22 have the bent shapes in which dimensions between the end portions and line segments along the X direction on the surfaces of the side walls 21 and 22 gradually increase toward the end portions in the X direction. By the configuration like this, reduction in weight of the arm can be achieved with the bent shape of the suspension arm 10.

The body portion 20 has the inward rib portions 24 and 25 in which the end surfaces in the two side walls 21 and 22 face each other in the section orthogonal to the X direction. The stepwise bending further has a rib bending step of bending the portions that compose the inward rib portions 24 and 25 in the workpiece W before forming the pair of first through-holes 51. By the configuration like this, it is possible to form the hollow shape with the open section in which the end surfaces of the two side walls 21 and 22 of the body portion 20 face each other via the gap 26.

(Modified Examples of Shapes of Die and Punch)

FIGS. 13(A) to (D) are sectional views showing modified examples of the die and punch that are used in the second bending step.

The sectional shape of the base portion 23 of the body portion 20 is not limited to the case of the planar shape (see FIG. 9(B)) as in the embodiment, and the shape can be appropriately modified.

Figure 13:
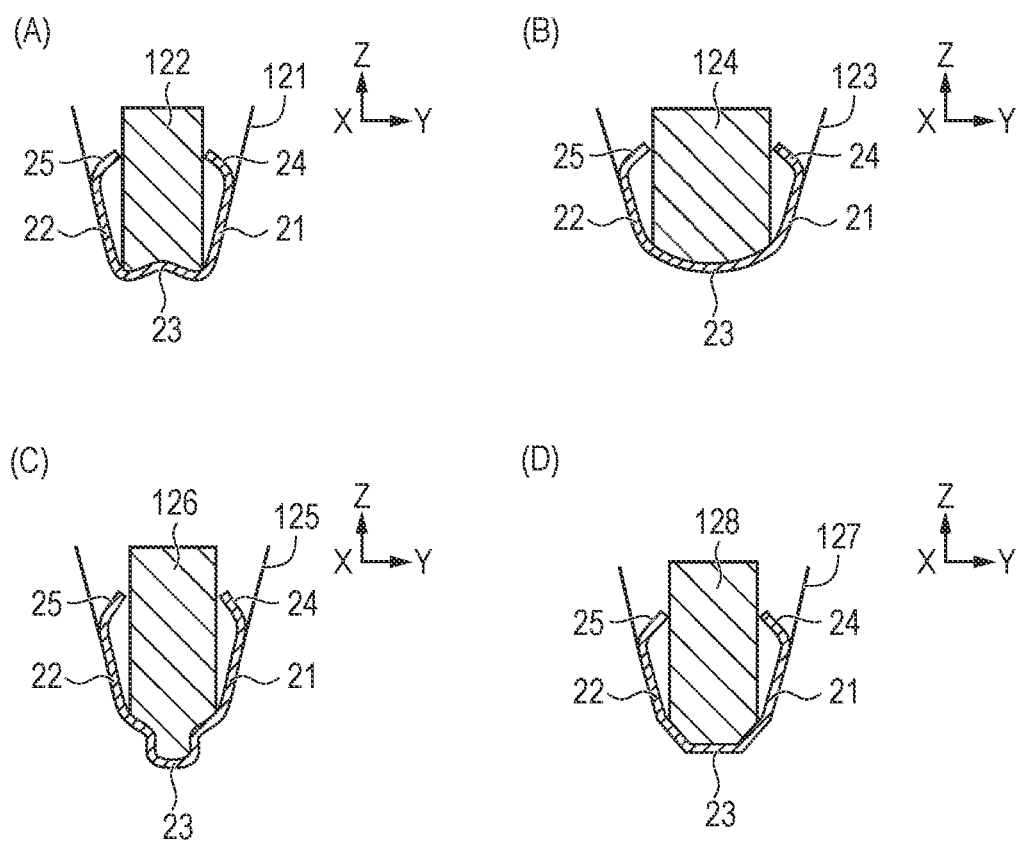
FIGS. 13 shows sectional views (A) through (D) showing modified examples of a punch and a die that are used in the second bending step.

A die 121 and a punch 122 shown in FIG. 13(A) form the sectional shape of the base portion 23 into an M-bent shape. A die 123 and a punch 124 shown in FIG. 13(B) form the sectional shape of the base portion 23 into a U-bent shape. A die 125 and a punch 126 shown in FIG. 13(C) form the sectional shape of the base portion 23 into a protrusively bent shape. A die 127 and a punch 128 shown in FIG. 13(D) form the sectional shape of the base portion 23 into a shoulder R (radius) bead shape.

The present invention is not limited to the aforementioned embodiment and can be properly modified. For example, the second through-holes 52 can be formed by burring.

The suspension arm 10 of the present embodiment has the mode shown in FIG. 3(A), but the present invention is not limited to this case. The present invention can also be applied to the suspension arms 60b and 60c of the modes shown in FIGS. 3(B) and 3(C). Furthermore, the present invention can also be applied to a suspension arm in a mode in which the base portion 23 of the body portion 20 has a bent shape, and the end portions (top surfaces of the inward rib portions 24 and 25) on the opposite side to the base portion 23 in the side walls 21 and 22 have linear shapes, though not illustrated.

REFERENCE SIGNS LIST

10: vehicle suspension arm
20: body portion
21, 22: side wall
23: base portion
24, 25: inward rib portion
26: gap
31: first coupling portion (coupling portion)
32: second coupling portion
41: first plate portion
42: second plate portion
51: first through-hole (through-hole)
51a: flange
51b: pilot hole
52: second through-hole
60a: suspension arm
60b: suspension arm
60c: suspension arm
72: fold given by first bending stop
101: die used in flange bending step
102: punch used in flange bending step
103: die used in burring step
104: punch used in burring step
105: die used in first bending step
106: punch (first punch) used in first bending step
107: die used in second bending step
108: punch (second punch) used in second bending step
109: die used in third bending step
110: punch (third punch) used in third bending step
W: workpiece

The invention claimed is:

1. A method for manufacturing a vehicle suspension arm including a hollow body portion, and coupling portions facing each other in a state where axes of a pair of through-holes are aligned with each other, the method comprising:
    forming at least the pair of through-holes including cylindrical flanges raised from a plate surface, in a workpiece by burring; and
    applying stepwise bending to the workpiece after the forming,
    the body portion having two side walls facing each other, and a base portion connecting the two side walls to each other and extending along one direction, and the coupling portions extending along the one direction from end portions in the one direction of the two side walls and facing each other apart from each other,
    wherein the stepwise bending comprises
    a first bending step of performing preliminary bending while holding a portion that composes the base portion of the body portion and a portion that composes the coupling portions in the workpiece by a first punch, and
    a second bending step of, while releasing holding of the portion that composes the coupling portions by the first punch, subsequently to the first bending step, performing bending along a fold given by the first bending step while holding the portion that composes the base portion of the body portion by a second punch, and
    wherein the portion that composes the coupling portions includes the plate surface around the flanges, and
    the preliminary bending in the first bending step is performed while holding the plate surface around the flanges by the first punch.

2. The method for manufacturing a vehicle suspension arm according to claim 1, wherein the preliminary bending in the first bending step is performed while also holding portions that compose the two side walls of the body portion by the first punch.

3. The method for manufacturing a vehicle suspension arm according to claim 1,
    wherein the stepwise bending further comprises
    a third bending step of, while releasing the pressing of the portion that composes the coupling portions by the first punch, subsequently to the second bending step, performing bending until the portions that compose the two side walls face each other, and the axes of the pair of through-holes of the coupling portions face each other in the state where the axes of the pair of through-holes are aligned with each other, while holding the portion that composes the base portion of the body portion by a third punch.

4. The method for manufacturing a vehicle suspension arm according to claim 1,
    wherein the base portion of the body portion has a bent shape in which dimensions between the base portion and line segments along the one direction on surfaces of the side walls gradually increase toward the end portions in the one direction, and
    the method further comprises
    a step of bending the portion that composes the base portion in the workpiece before forming the pair of through-holes to a curvature corresponding to the bent shape.

5. The method for manufacturing a vehicle suspension arm according to claim 1, wherein end portions on an opposite side to the base portion in the side walls have bent shapes in which dimensions between the end portions and line segments along the one direction on surfaces of the side walls gradually increase toward the end portions in the one direction.

6. The method for manufacturing a vehicle suspension arm according to claim 1,
    wherein the body portion has inward rib portions in which end surfaces in the two side walls face each other in a section orthogonal to the one direction,
    the method further comprises
    a rib bending step of bending portions that compose the inward rib portions in the workpiece before forming the pair of through-holes.

* * * * *